United States Patent
Hsiung et al.

(10) Patent No.: US 7,158,150 B2
(45) Date of Patent: Jan. 2, 2007

(54) IMAGE WIPE METHOD AND DEVICE

(75) Inventors: Jackie Hsiung, Shindian (TW); Sheng-Che Tsao, Shindian (TW)

(73) Assignee: Via Technologies, Inc., Shindian (TW)

( * ) Notice: Subject to any disclaimer, the term of this patent is extended or adjusted under 35 U.S.C. 154(b) by 99 days.

(21) Appl. No.: 10/944,836

(22) Filed: Sep. 21, 2004

(65) Prior Publication Data

US 2006/0028487 A1 Feb. 9, 2006

(30) Foreign Application Priority Data

Aug. 4, 2004 (TW) .............................. 93123284 A

(51) Int. Cl.
*G09G 5/02* (2006.01)

(52) U.S. Cl. ...................... 345/619; 715/730

(58) Field of Classification Search ................ 345/594, 345/619, 423, 547, 632, 6; 715/730–732
See application file for complete search history.

(56) References Cited

U.S. PATENT DOCUMENTS

| | | | | | |
|---|---|---|---|---|---|
| 5,142,275 | A | * | 8/1992 | Rockel | 345/635 |
| 5,355,150 | A | * | 10/1994 | Murakami | 345/574 |
| 5,736,988 | A | * | 4/1998 | Shaw et al. | 345/423 |
| 2002/0190946 | A1 | * | 12/2002 | Metzger | 345/156 |

* cited by examiner

*Primary Examiner*—Kee M. Tung
*Assistant Examiner*—Michelle K. Lay
(74) *Attorney, Agent, or Firm*—Bacon & Thomas, PLLC

(57) ABSTRACT

An image wipe method includes the steps of defining at least a first reference point to divide a screen area into several sub-areas according to the first reference points, selecting at least one sub-area, and performing a first image process on the selected sub-area. In addition, an image wipe device for executing the method is provided.

17 Claims, 6 Drawing Sheets

IMAGE WIPE METHOD AND DEVICE

BACKGROUND OF THE INVENTION

1. Field of Invention

The invention relates to image displaying action method and device and, in particular, to image wipe method and device.

2. Related Art

In the multimedia video application technology, the skilled persons, for increasing the attraction of screen transitions, had developed several transition actions such as dissolve, split, wipe, and the likes. The wipe action is to move the screen towards a single direction, or to rotate the screen. For example, a camera shutter mode can be applied to wipe two screens. In addition, the original screen can be substituted with the next screen by a door-open mode or a shutter-open mode.

However, the conventional transition action is generated according to the preset mode of the system, so it is not flexible enough for the user to custom-select desired action, including the area(s) for presenting the transition action and the kind of the transition action. In addition, since the wipe mode is limited, the various requirements of the user may not be satisfied. It is therefore a subjective of the invention to provide image wipe method and device, which can provide plentiful wipe modes for user selections, and improve vision qualities and feelings of user.

SUMMARY OF THE INVENTION

In view of the foregoing, the invention is to provide an image wipe method, which can provide plentiful wipe modes for user selections. The image wipe method of the invention includes the steps of: defining at least one first reference point to divide a screen area into a plurality of sub-areas; selecting at least one of the sub-areas; and performing a first image process on the selected sub-area. In the invention, the image wipe method further includes a step of performing a second image process on the residual unselected sub-areas. Herein, the first image process is, for example, displaying a first picture, and the second image process is, for example, displaying a second picture. In addition, the image wipe method may include a step of setting an area code for each of the sub-areas, respectively, wherein the area code is for indicating the sub-area to display a corresponding image. In such a case, the content of the area code can be determined according to the comparing result of the reference point and at least one counter value.

In addition, the invention provides an image wipe device, which includes a reference point defining module, an area dividing module, a selecting module, and an image processing module. In the invention, the reference point defining module defines a first reference point. The area dividing module divides a screen area into a plurality of sub-areas according to the first reference point. The selecting module selects at least one of the sub-areas, and the image processing module performs a first image process on the selected sub-area. Herein, the image wipe device may include an area code setting module, which sets an area code for each of the sub-areas respectively according to the comparing result of the first reference point and at least one counter value. Besides, the image wipe device further includes a user interface, which is for a user to change the reference point. Furthermore, the device may include a look-up table for recording the area code and a to-be-displayed image corresponding to the area code. The image processing module can access the look-up table to perform the first image process. Herein, the image wipe device can be installed in a multimedia computer system or a digital versatile disk (DVD) playing system.

As mentioned above, since the image wipe method and device of the invention firstly set at least one reference point to divide the screen area into a plurality of sub-areas and then select one sub-area for performing the image process, the reference point can be set according to user's demands so as to custom-divide the whole screen area. On the other hand, the selected sub-area(s) can be performed with the image process according to the user's demands. Thus, the invention can provide plentiful wipe modes for user selections, so that the desired image wipe action can be displayed. Accordingly, the user's demands can be satisfied and the practicability of the invention can be increased.

BRIEF DESCRIPTION OF THE DRAWINGS

The invention will become more fully understood from the detailed description given hereinbelow illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
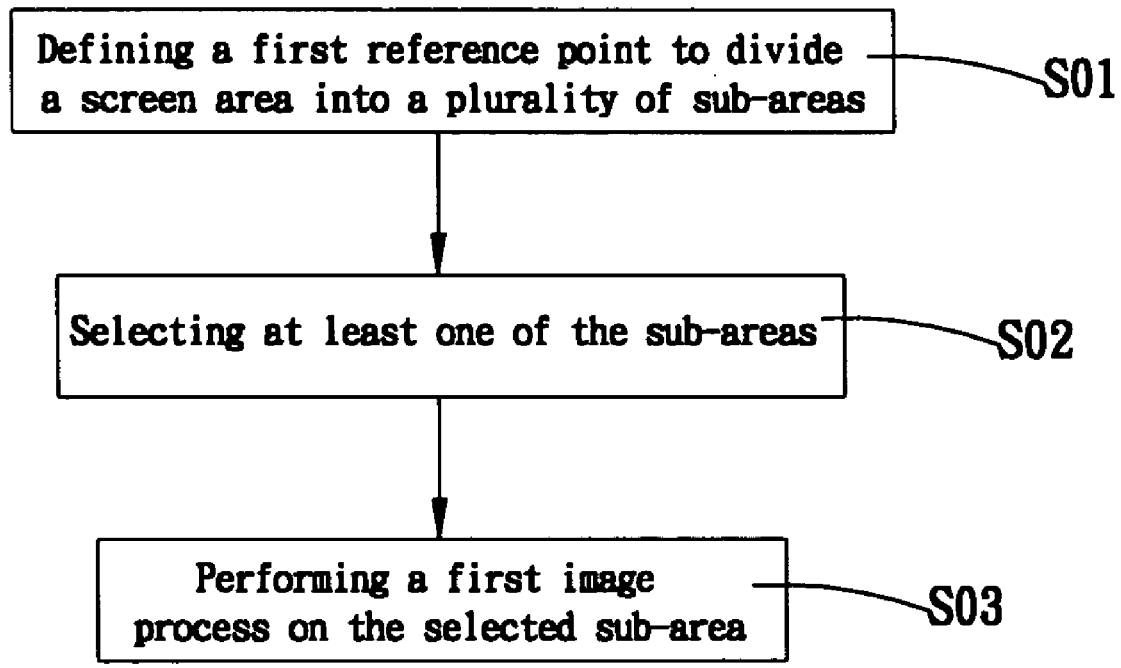
FIG. 1 is a flow chart showing an image wipe method according to a preferred embodiment of the invention

With reference to FIG. 1, an image wipe method 1 according to a preferred embodiment of the invention includes the following steps of: defining a first reference point to divide a screen area into a plurality of sub-areas (step S01); selecting at least one of the sub-areas (step S02); and performing a first image process on the selected sub-area (step S03).

Figure 2A:
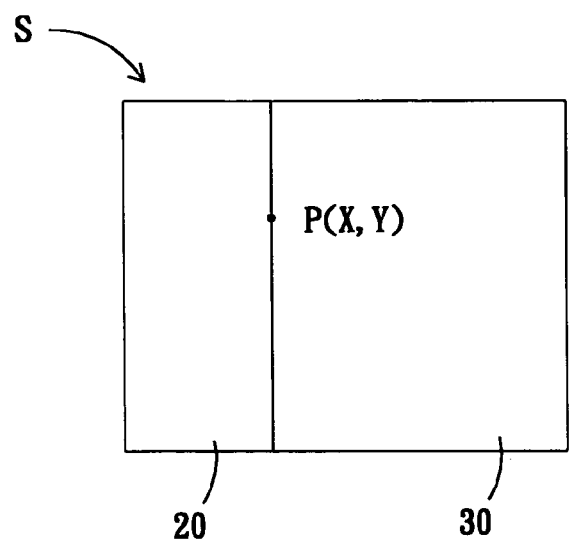
FIGS. 2A–2H are schematic views showing a whole screen area and sub-areas thereof.
Figure 2B:
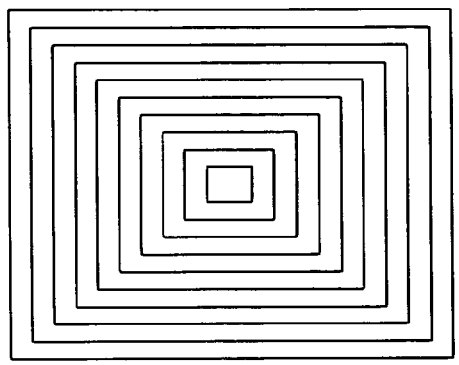
Figure 2C:
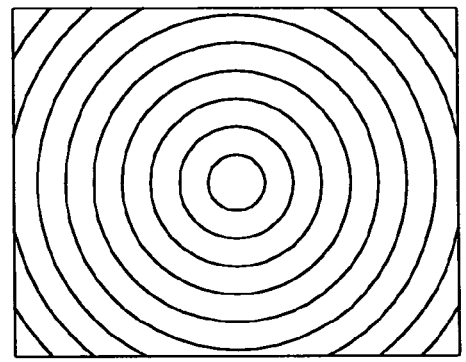
Figure 2D:
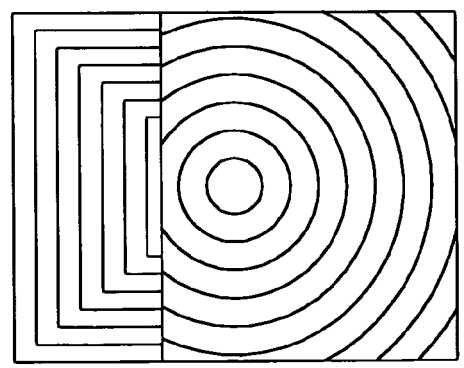

In the embodiment, the image wipe method 1 further includes a step of performing a second image process on the unselected sub-areas. Herein, the first image process is to display a first picture, and the second image process is to display a second picture. For example, as shown in FIG. 2A, a reference point P(X,Y) is defined to divide a screen area S into two sub-areas 20 and 30. The first picture includes a plurality of concentric rectangles as shown in FIG. 2B, and the second picture includes a plurality of concentric circles as shown in FIG. 2C. When the sub-area 20 is selected to display the first picture and the sub-area 30 is selected to display the second picture, the screen area S represents the image as shown in FIG. 2D. Moreover, if the X-coordinate of the reference point increases gradually, the screen area S can display a moving image, which is a wipe action to substitute the second picture with the first picture from left to right of the screen area S.

Figure 2E:
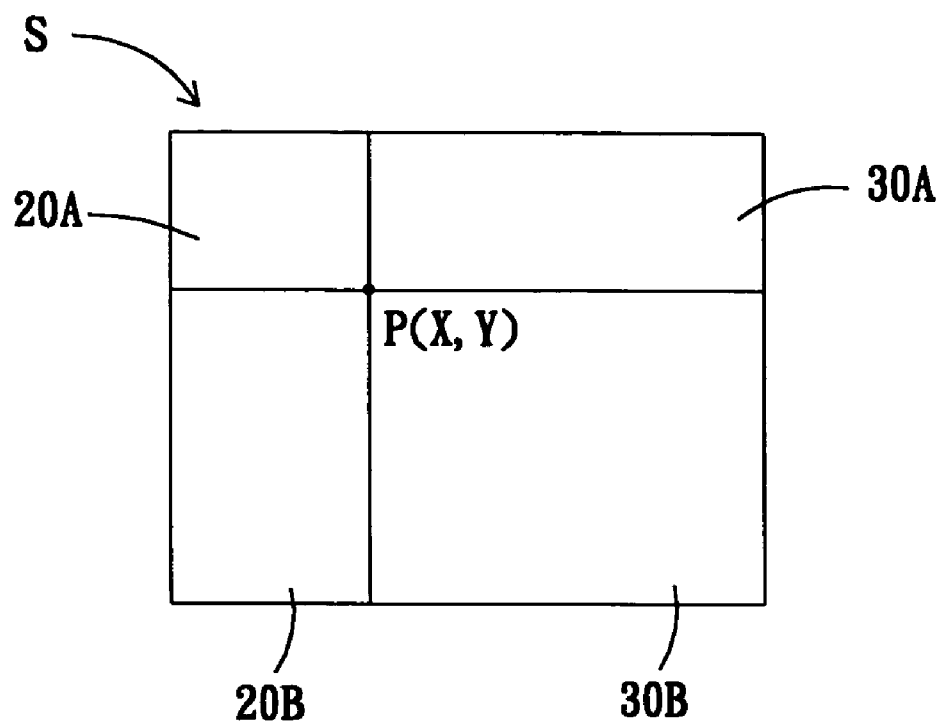
Figure 2F:
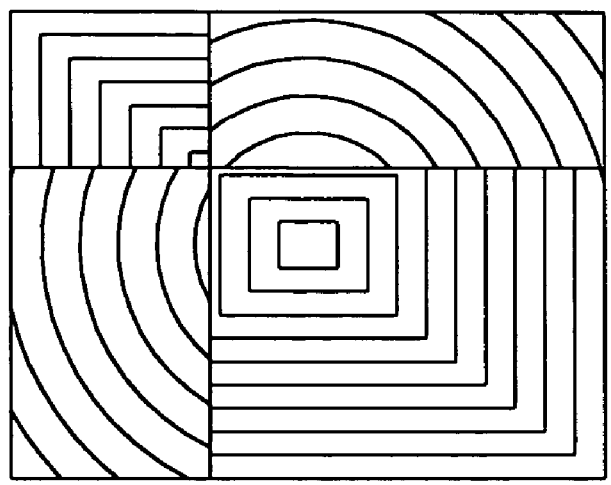

In addition, as shown in FIG. 2E, the screen area S can be divided into four sub-areas 20A, 20B, 30A and 30B according to the defined reference point P(X,Y). When the sub-areas 20A and 30B are selected to display the first picture and the sub-areas 20B and 30A are selected to display the second picture, the screen area S represents the image as shown in FIG. 2F.

Figure 2G:
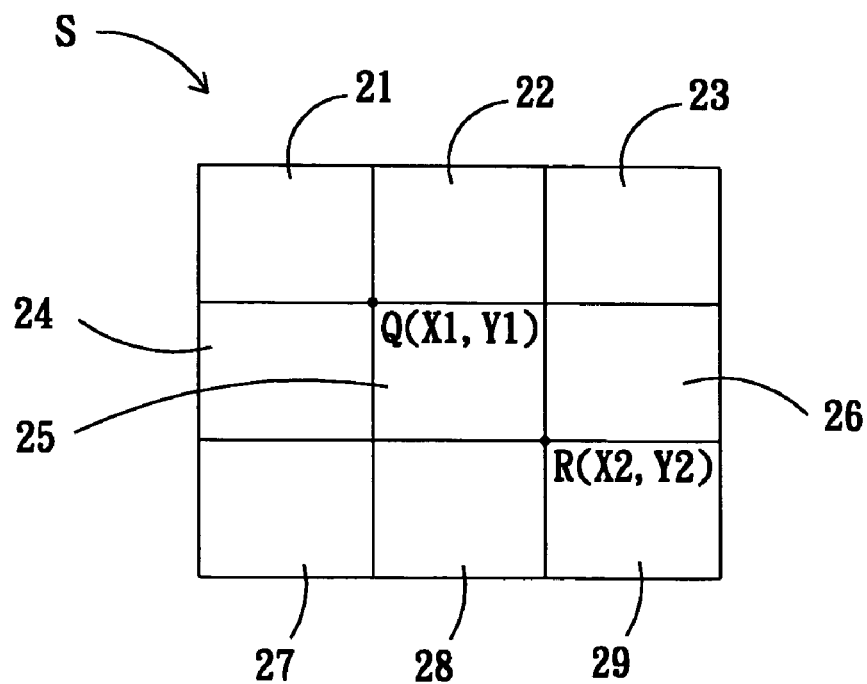
Figure 2H:
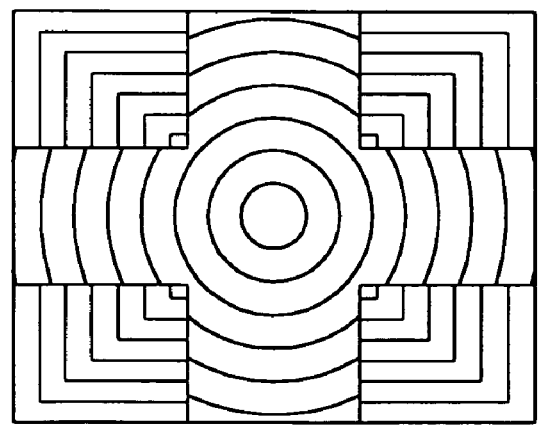

In the embodiment, the image wipe method 1 further includes a step of defining a second reference point to divide the screen area into a plurality of sub-areas according to the first reference point and the second reference point. For example, the screen area S can be divided into nine sub-areas 21–29 according to a first reference point Q(X1,Y1) and a second reference point R(X2,Y2) as shown in FIG. 2G. The first picture includes a plurality of concentric rectangles as shown in FIG. 2B, and the second picture includes a plurality of concentric circles as shown in FIG. 2C. When the corner sub-areas 21, 23, 27 and 29 are selected to display the first picture (the concentric rectangles) and the residual unselected sub-areas 22, 24, 25, 26 and 28 are to display the second picture (the concentric circles), the screen area S represents the image with wipe action as shown in FIG. 2H.

Figure 3:
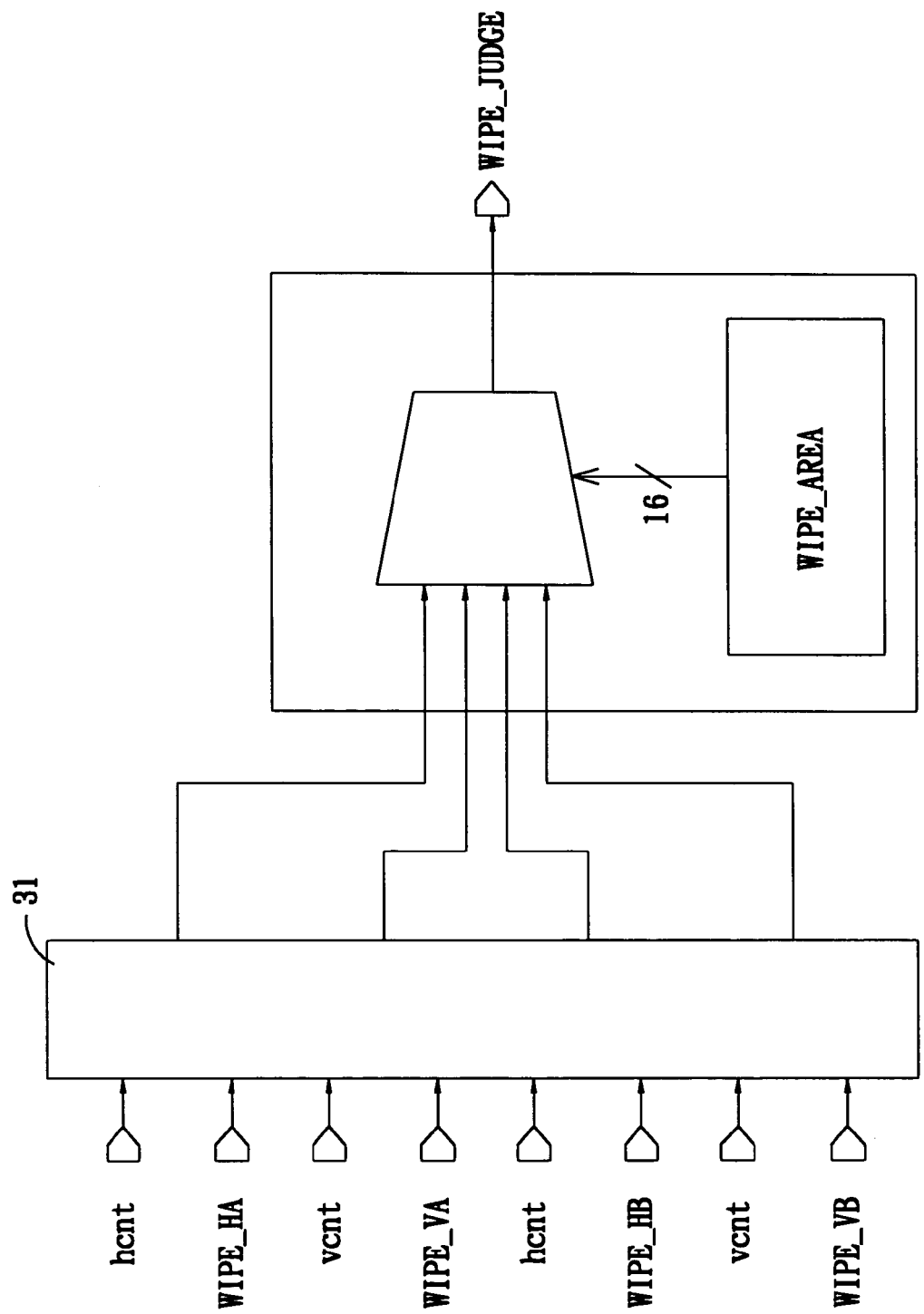
FIG. 3 is a flow chart showing a step of setting an area code for each sub-area according to a first reference point and a second reference point.

As mentioned above, the first reference point and the second reference point can be inputted by a user, so that the first and second reference points can be custom-defined. For example, the first reference point includes a fist horizontal coordinate and a first vertical coordinate, and the second reference point includes a second horizontal coordinate and a second vertical coordinate. Herein, these coordinates can be inputted by the user. As shown in FIG. 3, the first horizontal coordinate of the first reference point is "WIPE_HA", the first vertical coordinate of the first reference point is "WIPE_VA", the second horizontal coordinate of the second reference point is "WIPE_HB", and the second vertical coordinate of the second reference point is "WIPE_VB". If only the first reference point is defined, the area codes can be set according to the comparisons between the first horizontal coordinate WIPE_HA and a horizontal counter value hcnt, and/or between the first vertical coordinate WIPE_VA and a vertical counter value vcnt. For instance, when a comparing module determines the horizontal counter value hcnt is smaller than the first horizontal coordinate WIPE_HA, a corresponding output node outputs "0"; otherwise, when the comparing module determines the horizontal counter value hcnt is greater than the first horizontal coordinate WIPE_HA, the corresponding output node outputs "1". According to the comparing results, the whole screen area can be divided into 2 or 4 sub-areas. For example, the four sub-areas respectively have a two bits area code such as "00", "01", "10" and "11".

Figures 4, 5:
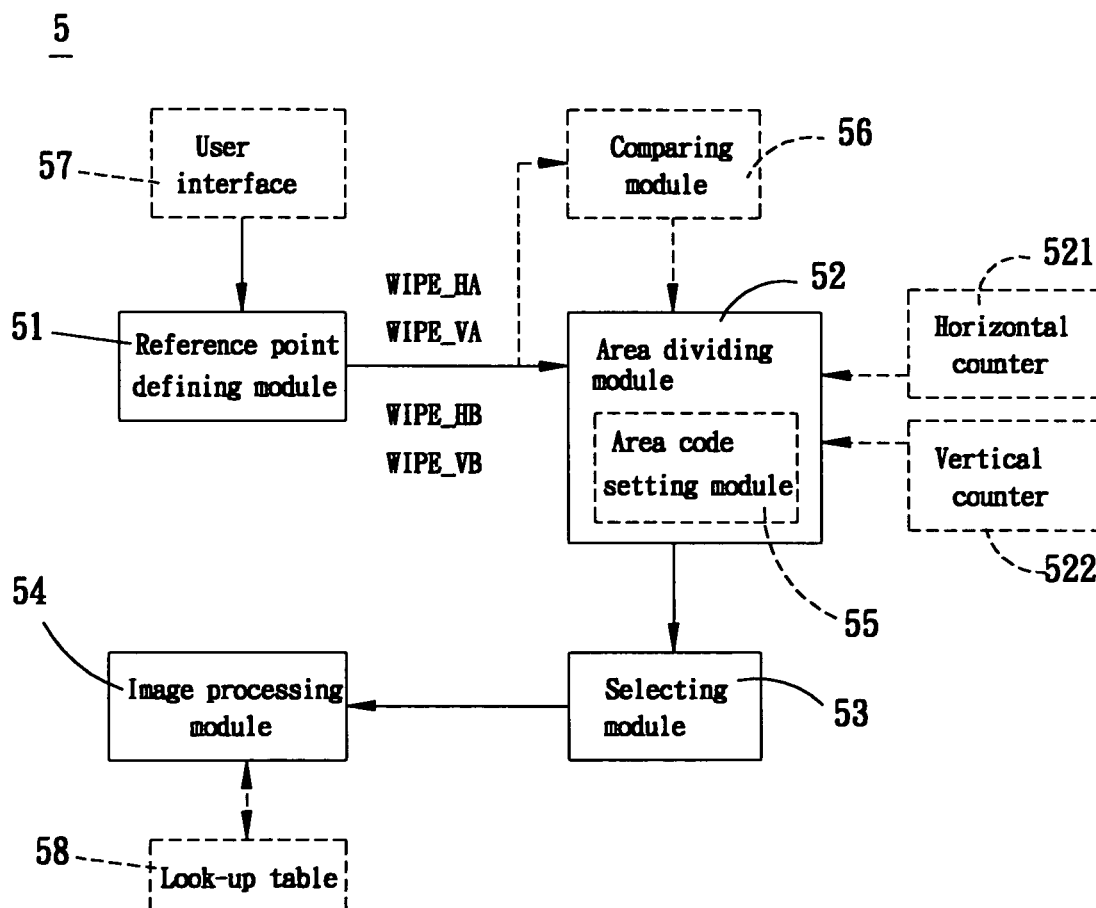
FIG. 4 is a schematic view showing the area codes of the sub-areas set according to the step shown in FIG. 3.
FIG. 5 is a schematic view showing an image wipe device according to a preferred embodiment of the invention.

In addition, if a first reference point and a second reference point are defined, the area codes can be set according to the comparisons between the first horizontal coordinate WIPE_HA and a horizontal counter value hcnt, between the second horizontal coordinate WIPE_HB and the horizontal counter value hcnt, between the first vertical coordinate WIPE_VA and a vertical counter value vcnt, and between the second vertical coordinate WIPE_VB and the vertical counter value vcnt. When a comparing module determines the horizontal counter value hcnt is smaller than the first horizontal coordinate WIPE_HA, a corresponding output node outputs "0"; otherwise, when the comparing module determines the horizontal counter value hcnt is greater than the first horizontal coordinate WIPE_HA, the corresponding output node outputs "1". When a comparing module determines the vertical counter value vcnt is smaller than the first vertical coordinate WIPE_VA, a corresponding output node outputs "0"; otherwise, when the comparing module determines the vertical counter value vcnt is greater than the first vertical coordinate WIPE_VA, the corresponding output node outputs "1". When a comparing module determines the horizontal counter value hcnt is smaller than the second horizontal coordinate WIPE_HB, a corresponding output node outputs "0"; otherwise, when the comparing module determines the horizontal counter value hcnt is greater than the second horizontal coordinate WIPE_HB, the corresponding output node outputs "1". When a comparing module determines the vertical counter value vcnt is smaller than the second vertical coordinate WIPE_VB, a corresponding output node outputs "0"; otherwise, when the comparing module determines the vertical counter value vcnt is greater than the second vertical coordinate WIPE_VB, the corresponding output node outputs "1". According to the comparing results and cooperating with a function such as a self-defined function WIPE_AREA, the whole screen area can be divided into 9 sub-areas. The nine sub-areas respectively have a four bits area code. As shown in FIG. 4, the area codes of the nine sub-areas, respectively, are "0000", "1000", "1010", "0100", "1100", "1110", "0101", "1101", and "1111". Then, the self-defined function WIPE_AREA is used to determine which area codes, such as "0000", "1010", "0101" and "1111", are selected. The selected area codes are respectively corresponding to the cornered four sub-areas. After that, another self-defined function WIPE_JUDGE determines that the selected sub-areas display the first picture (the concentric rectangles) and the unselected sub-areas, which corresponding to the area codes such as "1000", "0100", "1100", "1110", and "1101", display the second picture (the concentric circles). Accordingly, the wipe action can be obtained as shown in FIG. 2H.

To be noted, the applications of the image wipe method 1 depend on practical demands. For example, the first and second reference points respectively located on the diagonal line of the screen area, and are moved gradually to the two ends of the diagonal line as time goes by. In such a case, the screen area can display the wipe transition by animation. In addition, the number of the counter(s) and reference point(s) is not limited, and is customized according to the animation of the application. Therefore, the number of the sub-areas is not limited to a multiple of 2 and is various.

With reference to FIG. 5, an image wipe device 5 according to the embodiment of the invention includes a reference point defining module 51, an area dividing module 52, a selecting module 53, and an image processing module 54. The reference point defining module 51 defines the reference point(s). The area dividing module 52 divides a screen area into a plurality of sub-areas according to the reference point(s). The selecting module 53 selects at least one of the sub-areas. The image processing module 54 performs a first image process on the selected sub-area(s), and may further perform a second image process on the unselected sub-area(s). In the present embodiment, the first image process is to display a first picture, and the second image process is to display a second picture.

As mentioned above, the reference point defining module 51 receives required coordinates of two reference points custom-inputted by a user so as to define a first reference point and a second reference point. For example, the first horizontal coordinate of the first reference point is "WIPE_HA", the first vertical coordinate of the first reference point is "WIPE_VA", the second horizontal coordinate of the second reference point is "WIPE_HB", and the second vertical coordinate of the second reference point is "WIPE_VB".

The area dividing module 52 can divide a screen area into several sub-areas, such as nine sub-areas, according to the first reference point, the second reference point, the first horizontal coordinate "WIPE_HA", the first vertical coordinate "WIPE_VA", the second horizontal coordinate "WIPE_HB", and the second vertical coordinate "WIPE_VB". Herein, the area dividing module 52 may further include an area code setting module 55, which sets an area code for each of the sub-areas, respectively, according to the first reference point and at least one counter value. For instance, the area code setting module 55 can cooperate with a self-defined function WIPE_AREA, a horizontal counter 521, and a vertical counter 522 to calculate the value of every digit of the area code (having four digits) corresponding to each sub-area. The calculated area code can be, for example, the above mentioned area code such as "0000", "1000", "1010", "0100", "1100", "1110", "0101", "1101", or "1111".

The selecting module 53 selects one area code to select one corresponding sub-area. In the embodiment, the selecting module 53 can utilize a self-defined function WIPE_JUDGE to determine which one is the selected sub-area. Finally, the image processing module 54 performs a first image process on the selected sub-areas and performs a second image process on the unselected sub-areas (as shown in FIG. 2D). The first image process is, for example, displays a first picture (the concentric rectangles), and the second image process is, for example, displays a second picture (the concentric circles). In details, the self-defined function WIPE_JUDGE firstly determines whether a certain one of the sub-areas is a selected sub-area or not. If the determining result is true, this sub-area displays the first picture (the concentric rectangles); otherwise, if the determining result is false, this sub-area displays the second picture (the concentric circles). Furthermore, the image wipe device 5 may include a comparing module 56, which compares the first reference point and at least one counter value so as to output a result signal for composing the area code. The image wipe device 5 may also include a user interface 57, which is for a user to change the reference point. Therefore, the reference point defining module 51 can custom-define the first reference point. In addition, the image wipe device 5 may include a look-up table 58, which records the area code(s) and the to-be-displayed image(s) corresponding to the area code(s). Thus, the image processing module 54 can access the look-up table 58 to display the to-be-displayed image(s) on the selected sub-area(s) so as to perform the first image process. To be noted, the image wipe device 5 can be installed in a multimedia computer system or a digital versatile disk (DVD) playing system.

In summary, the reference point can be set according to user's demands so as to divide the whole screen area customized, and the selected sub-area(s) can be performed with the image process according to the user's demands. Moreover, the sub-areas can be quickly selected to perform the demanded image wipe actions, and then the plentiful wipe modes are provided, so that the desired image wipe action can be displayed. Accordingly, the user's demands can be satisfied and the practicability of the invention can be increased.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. An image wipe method, comprising:
   defining a first reference point to divide a screen area into a plurality of sub-areas;
   selecting at least one of the sub-areas; and
   performing a first image process on the selected sub-area, wherein the first image process is to display a first picture.

2. The method of claim 1, further comprising:
   performing a second image process on the unselected sub-areas.

3. The method of claim 2, wherein the second image process is to display a second picture.

4. The method of claim 1, further comprising:
   defining a second reference point to divide the screen area into a plurality of sub-areas according to the first reference point and the second reference point.

5. The method of claim 4, wherein the first reference point and the second reference point are custom-defined.

6. The method of claim 4, wherein the first reference point comprises a first horizontal coordinate and a first vertical coordinate, and the second reference point comprises a second horizontal coordinate and a second vertical coordinate.

7. The method of claim 1, further comprising:
   setting an area code for each of the sub-areas respectively, wherein the area code is for indicating the sub-areas to display corresponding images.

8. The method of claim 7, further comprising:
   comparing the first reference point and at least one counter value to set the area code.

9. An image device, comprising:
   a reference point defining module, which defines a first reference point;
   an area dividing module, which divides a screen area into a plurality of sub-areas according to the first reference point;
   a selecting module, which selects at least one of the sub-areas; and
   an image processing module, which performs a first image process on the selected sub-area, wherein the first image process is to display a first picture.

10. The device of claim 9, wherein the image processing module further performs:
    a second image process on the unselected sub-areas, and the second image process is to display a second picture.

11. The device of claim 9, wherein the area dividing module further comprising:
    an area code setting module, which sets an area code for each of the sub-areas respectively according to the first reference point and at least one counter value.

12. The device of claim 11, further comprising:
    a comparing module, which compares the first reference point and the counter value to output a result signal for composing the area code.

13. The device of claim 11, further comprising:
    a selecting module, which selects at least one of the area codes to retrieve the corresponding sub-area.

14. The device of claim 11, further comprising:
a look-up table, which records the area code and a to-be-displayed image corresponding to the area code, wherein the image processing module accesses the look-up table to display the to-be-displayed image on the selected sub-areas so as to perform the first image process.

15. The device of claim 9, wherein the reference point defining module further defines a second reference point.

16. The device of claim 9, further comprising:
a user interface, which is for a user to change the reference point and for the reference point defining module to custom-define the first reference point.

17. The device of claim 9, which is installed in a multimedia computer system or a digital versatile disk (DVD) playing system.

* * * * *